(12) United States Patent
Jordan et al.

(10) Patent No.: US 12,033,524 B2
(45) Date of Patent: *Jul. 9, 2024

(54) SYSTEMS AND METHODS FOR DETECTING, MONITORING, AND MITIGATING THE PRESENCE OF UNAUTHORIZED DRONES

(71) Applicant: SkySafe, Inc., San Diego, CA (US)

(72) Inventors: Grant Jordan, San Diego, CA (US); Scott Torborg, San Diego, CA (US); Chun Kin Au Yeung, San Diego, CA (US); Brandon Fang-Hsuan Lo, San Diego, CA (US)

(73) Assignee: SkySafe, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,426

(22) Filed: May 23, 2023

(65) Prior Publication Data
US 2023/0298475 A1    Sep. 21, 2023

Related U.S. Application Data

(63) Continuation of application No. 16/915,865, filed on Jun. 29, 2020, now Pat. No. 11,663,922.

(51) Int. Cl.
*G08G 5/00* (2006.01)
*H04B 1/06* (2006.01)

(52) U.S. Cl.
CPC ............ *G08G 5/0082* (2013.01); *H04B 1/06* (2013.01)

(58) Field of Classification Search
CPC .. G08G 5/0082; G08G 5/0013; G08G 5/0026; G08G 5/0069; H04B 1/06
See application file for complete search history.

(56) References Cited

U.S. PATENT DOCUMENTS

| 5,345,539 A | 9/1994 | Webb |
| 8,837,337 B2 * | 9/2014 | Blanz ................... H04L 1/0034 370/310 |

(Continued)

FOREIGN PATENT DOCUMENTS

| CN | 107272743 A | 10/2017 |
| CN | 109067478 A | 12/2018 |

(Continued)

OTHER PUBLICATIONS

Machine translation of JP-2004527166 A. (Year: 2004).*

(Continued)

*Primary Examiner* — Jean B Corrielus
(74) *Attorney, Agent, or Firm* — KNOBBE MARTENS OLSON & BEAR LLP

(57) ABSTRACT

Systems and methods for detecting, monitoring, and mitigating the presence of a drone are provided herein. In one aspect, a system for detecting presence of a drone includes a radio-frequency (RF) receiver. The system can further include a processor and a computer-readable memory in communication with the processor and having stored thereon computer-executable instructions to cause the at least one processor to receive a set of samples from the RF receiver for a time interval, obtain predetermined data of expected communication protocols used between the drone and a controller, and determine whether the RF signal corresponds to one of the expected communication protocols by comparing the samples of the RF signal to the predetermined data and decoding the RF signal. In further aspects the system extracts a unique identifier of the drone based at least partially on the decoded RF signal.

20 Claims, 11 Drawing Sheets

(56) References Cited

U.S. PATENT DOCUMENTS

| | | | |
|---|---|---|---|
| 9,275,645 | B2 | 3/2016 | Hearing et al. |
| 9,529,360 | B1 | 12/2016 | Melamed et al. |
| 9,763,177 | B1 | 9/2017 | Baskaran et al. |
| 9,996,079 | B2 | 6/2018 | Magy et al. |
| 10,051,475 | B2 | 8/2018 | Shattil et al. |
| 10,237,743 | B2 | 3/2019 | Shattil et al. |
| 10,317,506 | B2 | 6/2019 | Seeber et al. |
| 11,190,233 | B2 | 11/2021 | Fang-Hsuan et al. |
| 2006/0071671 | A1 | 4/2006 | Tola |
| 2014/0349666 | A1 | 11/2014 | Sun |
| 2017/0148332 | A1 | 5/2017 | Ziemba et al. |
| 2017/0295551 | A1 | 10/2017 | Sadiq |
| 2018/0017665 | A1 | 1/2018 | Wittenberg |
| 2018/0081355 | A1 | 3/2018 | Magy et al. |
| 2019/0103030 | A1 | 4/2019 | Banga et al. |
| 2020/0382156 | A1 | 12/2020 | Lo et al. |

FOREIGN PATENT DOCUMENTS

| | | |
|---|---|---|
| DE | 102009055263 A1 | 6/2011 |
| GB | 2546438 | 7/2017 |
| KR | 20180054007 A | 5/2018 |
| WO | WO 2018/125686 A2 | 7/2018 |
| WO | WO 2018/170736 A1 | 9/2018 |

OTHER PUBLICATIONS

D. Angelosante, G. B. Giannakis, and N. D. Sidiropoulos, "Estimating multiple frequency-hopping signal parameters via sparse linear regression,"IEEE Transactions on Signal Processing, vol. 58, No. 10, pp. 5044-5056, Oct. 2010.

Beyme et al. "Efficient Computation of DFT of Zadoff-Chu sequences," Elec. Letters (2009) vol. 45, No. 9, pp. 461-463.

"Drone Market Is Estimated to Expand at a Healthy CAGR in the Upcoming Forecast 2025," [Online] Sep. 13, 2019 https://www.americanewshour.com/?s=Drone+Market+Is+Estimated+To+Expand+At+a+Healthy+CAGR+in+the+Upcoming+Forecast+2025.

"Evolved Universal Terrestrial Radio Access (E-UTRA); Physical Channels and Modulation," 3GPP TS 36.211 (2018) vol. 15.0.

M. A. Fischler and R. C. Bolles, "Random sample consensus: A paradigm for model fitting with applications to image analysis and automated cartography," Communications of the ACM, vol. 24, No. 6, pp. 381-395, Jun. 1981.

Federal Aviation Administration, "FAA aerospace forecasts fiscal years 2019-2039," 2019. [Online]. Available: https://www.faa.gov/data research/aviation/aerospace forecasts/.

"FCC Part 15.247 Test Report for GL300A (FCC ID:SS3-GL3001501)," Tech. Rep., Apr. 2015. [Online]. Available: https://fccid.io/SS3-GL3001501/Test-Report/Test-Report-Rev-2599009.

"FCC Part 15.247 Test Report for GL300F (FCC ID:SS3-GL300F1609)," Tech. Rep., Sep. 2016. [Online]. Available: https://fccid.io/SS3-GL300F1609/Test-Report/Test-Report-3155813.

"FCC Part 15.247 Test Report for GL300C (FCC ID: SS3-GL3001510)," Tech. Rep., Oct. 2015. [Online]. Available: https://fccid.io/SS3-GL3001510/RF-Exposure-Info/SAR-Test-Report-2805129.

Gul et al. "Timing and Frequency Synchronization for OFDM Downlink Transmissions Using Zadoff-Chu Sequences," IEEE Trans. on Wireless Comm. (2015) vol. 14, No. 3, pp. 1716-1729.

Haiquan et al, "Proactive eavesdropping in UAV-aided mobile relay systems", EURASIP Journal on Wireless Communications and Networking, Springer International Publishing, CHAM, vol. 2020, No. 1, Feb. 24, 2020 (Feb. 24, 2020).

International Preliminary Report on Patentability issued in application No. PCT/US2020/032391, dated Jul. 19, 2021.

International Search Report dated Jul. 14, 2020, issued in corresponding International Application No. PCT/US2020/032391, filed May 11, 2020.

International Search Report dated Sep. 8, 2020, issued in corresponding International Application No. PCT/US2020/034969, filed May 28, 2020.

International Search Report and Written Opinion issued in application No. PCT/US2021/031801, dated Aug. 17, 2021.

Kim et al. "A delay-robust random access preamble detection algorithm for LTE system," Proc. RWS (2012) pp. 7578.

Liang et al. "The Research on Random Access Signal Detection Algorithm in LTE Systems," 2013 $5^{th}$ IEEE Intl. Symp. on Microwave, Ant. Prop. and EMC Tech. for Wireless Comm. (2013) pp. 115118.

Simon et al., "On the Implementation and Performance of Single and Double Differential Detection Schemes", IEEE Transactions on Communications, IEEE Service Center, Piscataway, NJ. USA, vol. 40, No. 2, Feb. 1, 1992 (Feb. 1, 1992), pp. 278-291.

Written Opinion issued in corresponding international application No. PCT/US2021/031801, dated May 27, 2022.

X. Liu, N. D. Sidiropoulos, and A. Swami, "Joint hop timing and frequency estimation for collision resolution in FH networks," IEEE Transactions on Wireless Communications, vol. 4, No. 6, pp. 3063-3074, Nov. 2005.

Lo, Brandon F., et al., "HopSAC: Frequency Hopping Parameter estimation Based on Random Sample Consensus for Counter-Unmanned Aircraft Systems", MILCOM 2019-2019 IEEE Military Communications Conference (MILCOM), IEEE Nov. 12, 2019, pp. 355-360.

\* cited by examiner

SYSTEMS AND METHODS FOR DETECTING, MONITORING, AND MITIGATING THE PRESENCE OF UNAUTHORIZED DRONES

CROSS-REFERENCE TO RELATED APPLICATION(S)

This application is a continuation of U.S. Non-Provisional application Ser. No. 16/915,865, filed Jun. 29, 2020, now U.S. Pat. No. 11,663,922. The foregoing application is hereby incorporated by reference in its entirety. Any and all applications for which a foreign or domestic priority claim is identified in the Application Data Sheet as filed with the present application are hereby incorporated by reference under 37 CFR 1.57.

BACKGROUND

Technological Field

The systems and methods disclosed herein are directed to detecting, monitoring, and mitigating unauthorized drones. More particularly, the systems and methods can be used to detect the presence of a drone using a plurality of nodes.

Description of the Related Technology

In recent years, Unmanned Aircraft Systems (UAS), more commonly known as drones, have been used extensively in a large number of exciting and creative applications, ranging from aerial photography, agriculture, product delivery, infrastructure inspection, aerial light shows, and hobbyist drone racing. Despite the usefulness of drones in many applications they also pose increasing security, safety, and privacy concerns. Drones are being used to smuggle weapons and drugs across borders. The use of drones near airports presents safety concerns, which may require airports to shut down until the surrounding airspace is secured. Drones are also used as a tool of corporate and state espionage activities. Thus, there is demand for an effective Counter-Unmanned Aircraft System (CUAS) solution to detect and monitor drones and mitigate the threat of drones when necessary.

SUMMARY

The systems, methods and devices of this disclosure each have several innovative aspects, no single one of which is solely responsible for the desirable attributes disclosed herein.

In one aspect, there is provided a system for detecting presence of a drone, the system comprising: a radio-frequency (RF) receiver configured to receive an RF signal; a processor; and a computer-readable memory in communication with the processor and having stored thereon computer-executable instructions to cause the processor to: receive a set of samples from the RF receiver for a time interval, the set of samples comprising samples of the RF signal; obtain predetermined data of expected communication protocols used between the drone and a controller; determine whether the RF signal corresponds to one of the expected communication protocols by comparing the samples of the RF signal to the predetermined data; if the RF signal corresponds to one of the expected communication protocols, decode the RF signal; and extract a unique identifier of the drone based at least partially on the decoded RF signal.

In another aspect, there is provided a method for detecting presence of a drone, the method comprising: receiving a set of samples from an RF receiver for a time interval, the set of samples comprising samples of an RF signal; obtaining predetermined data of expected communication protocols used between the drone and a controller; determining whether the RF signal corresponds to one of the expected communication protocols by comparing the samples of the RF signal to the predetermined data; if the RF signal corresponds to one of the expected communication protocols, decoding the RF signal; and extracting a unique identifier of the drone based at least partially on the decoded RF signal.

In another aspect, there is provided a non-transitory computer readable storage medium having stored thereon instructions that, when executed, cause a computing device to: receive a set of samples from an RF receiver for a time interval, the set of samples comprising samples of an RF signal; obtain predetermined data of expected communication protocols used between the drone and a controller; determine whether the RF signal corresponds to one of the expected communication protocols by comparing the samples of the RF signal to the predetermined data; if the RF signal corresponds to one of the expected communication protocols, decode the RF signal; and extract a unique identifier of the drone based at least partially on the decoded RF signal.

DETAILED DESCRIPTION

Figure 1:
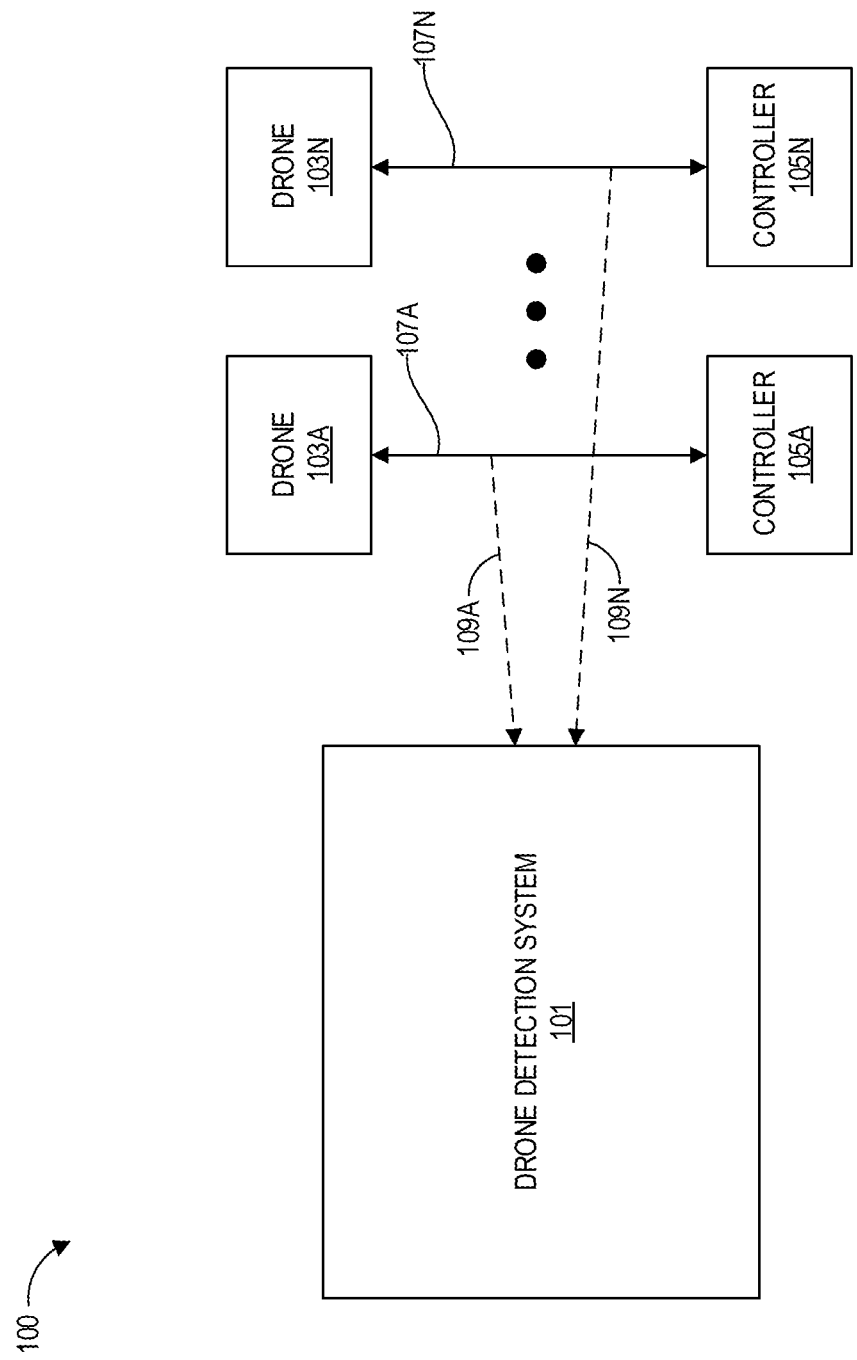
FIG. 1 illustrates an example environment including a drone detection system in accordance with aspects of this disclosure.

The fast growth of drone applications in industrial, commercial and consumer domains in recent years has caused great security, safety and privacy concerns. For this reason, demand has been growing for systems and technique for drone detection, monitoring, and mitigation.

A CUAS system (or simply "drone detection systems") can operate using multiple stages. In a first stage, the drone detection system detects the presence of a drone and determine whether the drone is a friend or a foe. The drone detection system can accomplish this by eavesdropping or monitoring the signals exchanged between the drone and the controller.

The drone detection system can include predetermined data or knowledge of expected communication protocols used between drones and their controllers. Different brands of drones and different drone models within a brand may use different communication protocols. In certain cases, different versions of the same drone model use different communication protocols. Reverse engineering can be employed to determine the data and knowledge relating to expected communication protocols.

The drone detection system can store the predetermined data or knowledge of the communication protocols used by different combinations of drones and controllers to communicate with each other. The drone detection system can gather the predetermined data or knowledge prior to deployment. For example, the predetermined data can include frequencies known to be used by a particular drone model. In certain embodiments, the drone detection system receives update data to the predetermined data or knowledge after deployment of the drone detection system. In certain embodiments, the drone detection system itself updates the predetermined data or knowledge based on its ongoing operations of detecting, monitoring, and/or mitigating drones.

Certain aspects of this disclosure may relate to how the drone detection system can leverage the predetermined data to determine additional data uniquely associated with the detected drone and its controller. For example, the drone detection system can scan the airwaves at frequencies known to be used by a particular drone model. If a known protocol is identified, then the drone detection system can proceed to decode the signal as if it was the intended controller.

Certain aspects of this disclosure may relate to how the drone detection system can identify flight and drone data once the communication protocol used by the drone has been decoded. Exemplary flight and drone data can include a unique identifier of the drone such as one or more of a serial number, a frequency hopping pattern, and/or a transmission timing and frequency.

In certain embodiments, exemplary flight and drone data can include wireless signal properties such as received energy level, delay spread and doppler spread, power delay profile, carrier frequency offset, and/or sampling time offset.

Certain aspects of this disclosure may relate to how the drone detection system can determine additional or key information for the detected drone. Exemplary key information includes home position, flight duration, traveling velocity, GPS coordinates, individual propeller rotation speed, and/or video feed.

Small drones, which are widely used in recreational and commercial applications, have caused alarming concerns of public safety and homeland security due to frequently reported unauthorized drone incidents in recent years. To effectively disable potential threats from drones and controllers, drone detection systems may be configured to mitigate drone operation. The drone detection system can either be mounted on a fixed location or onto a mobile unit.

In certain embodiments, the drone detection system comprises multiple nodes over a region. The individual nodes can cooperate with other nodes in their detection and mitigation. In a centralized configuration, the nodes send intermediate detection results to a centralized processor. The centralized processor can then determine detection results. In a decentralized configuration, the nodes share their detection results and can mitigate the drones either by themselves or cooperatively with the other nodes.

Therefore, it is desirable to provide a drone detection system to meet all these requirements. Aspects of this disclosure relate to various node configurations of the drone detection system. Other aspects of this disclosure relate to identifying flight and drone data such as unique identifiers and/or wireless signal properties once the communication protocol used by the drone has been decoded. Other aspects of this disclosure relate to how the drone detection system can determine additional or key information for the detected drone.

Advantageously, aspects of this disclosure can leverage the predetermined data to efficiently determine additional data uniquely associated with the detected drone and its controller.

FIG. 1 illustrates an example environment 100 including a drone detection system 101 in accordance with aspects of this disclosure. In certain embodiments, the environment 100 includes the drone detection system 101, one or more drones 103A-103N, and one or more drone controllers 105A-105N (or simply "controllers"). An example of the one or more drones 103A-103N is illustrated in FIG. 2B. An example of the one or more controllers 105A-105N is illustrated in FIG. 2C.

In certain embodiments, each of the drones 103A-103N' is configured to communicate to a corresponding one of the controllers 105A-105N via an RF signal 107A-107N. Although not illustrated, in some embodiments, a single one of the controllers 105A-105N may be configured to control more than one of the drones 103A-103N.

The drone detection system 101 is configured to monitor 109A-109N communications between the drones 103A-103N and the controllers 105A-105N in order to detect the presence of the drones 103A-103N and/or the controllers 105A-105N. For example, the drone detection system 101 may be configured to receive the RF signals 107A-107N being sent between the drones 103A-103N and the controllers 105A-105N in order to monitor 109A-109N the communication between the drones 103A-103N and the controllers 105A-105N. In certain embodiments, once the drone detection system 101 can decode the RF signals 107A-107N, the drone detection system 101 may monitor the drones 103A-103N and take certain actions in order to mitigate the potential threat of the drones 103A-103N. For example, as is explained with respect to FIG. 10, the drone detection system 101 may transmit a jamming RF signal to disrupt communication between the detected drone 103A-103N and the controller 105A-105N, and/or spoof the controller 105A-105N by sending a command to the drone 103A-103N to land or otherwise leave the environment 100.

Figure 2A:
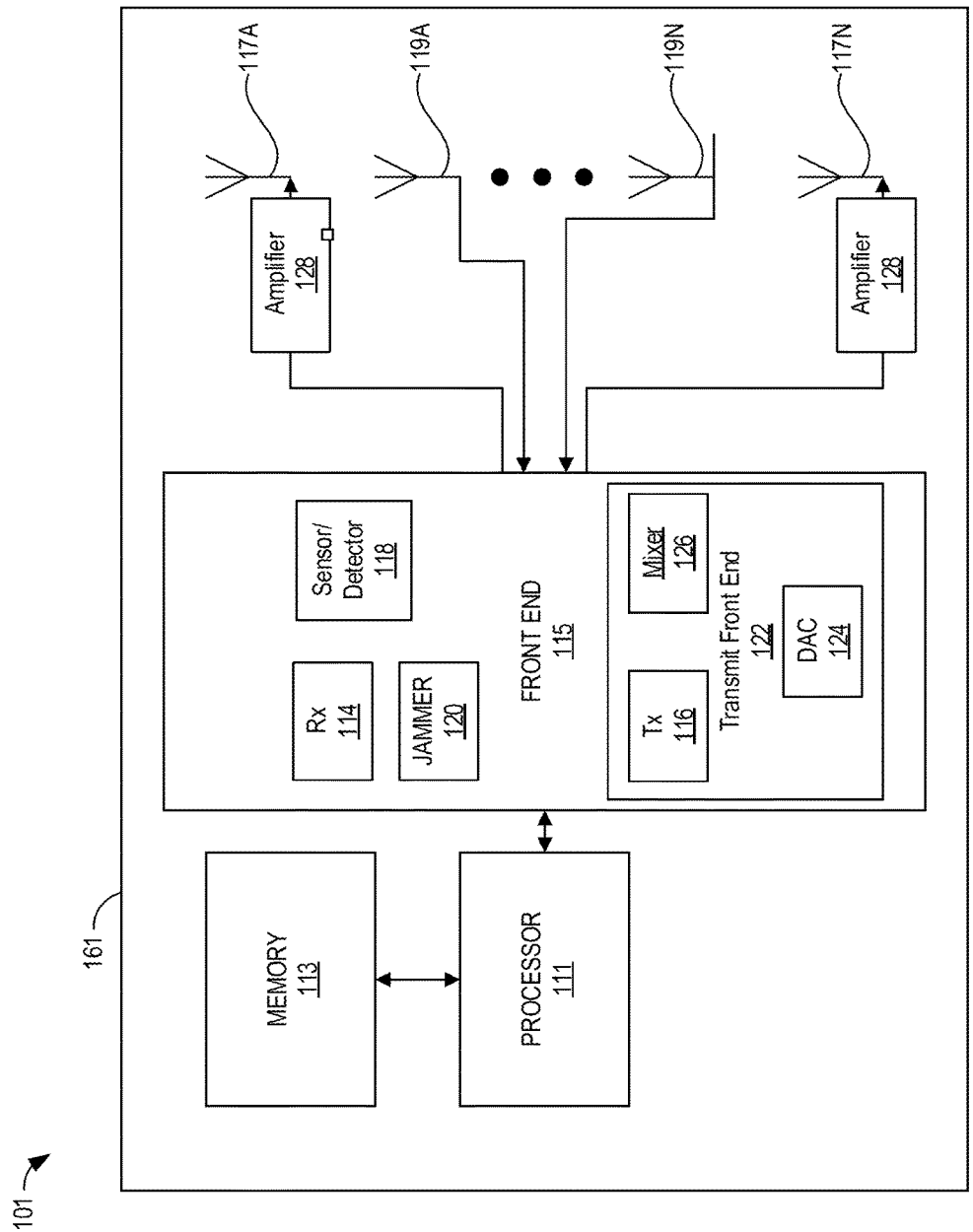
FIG. 2A illustrates an example drone detection system from FIG. 1 which can be used to detect, monitor, and/or mitigate drones in accordance with aspects of this disclosure.
Figure 2B:
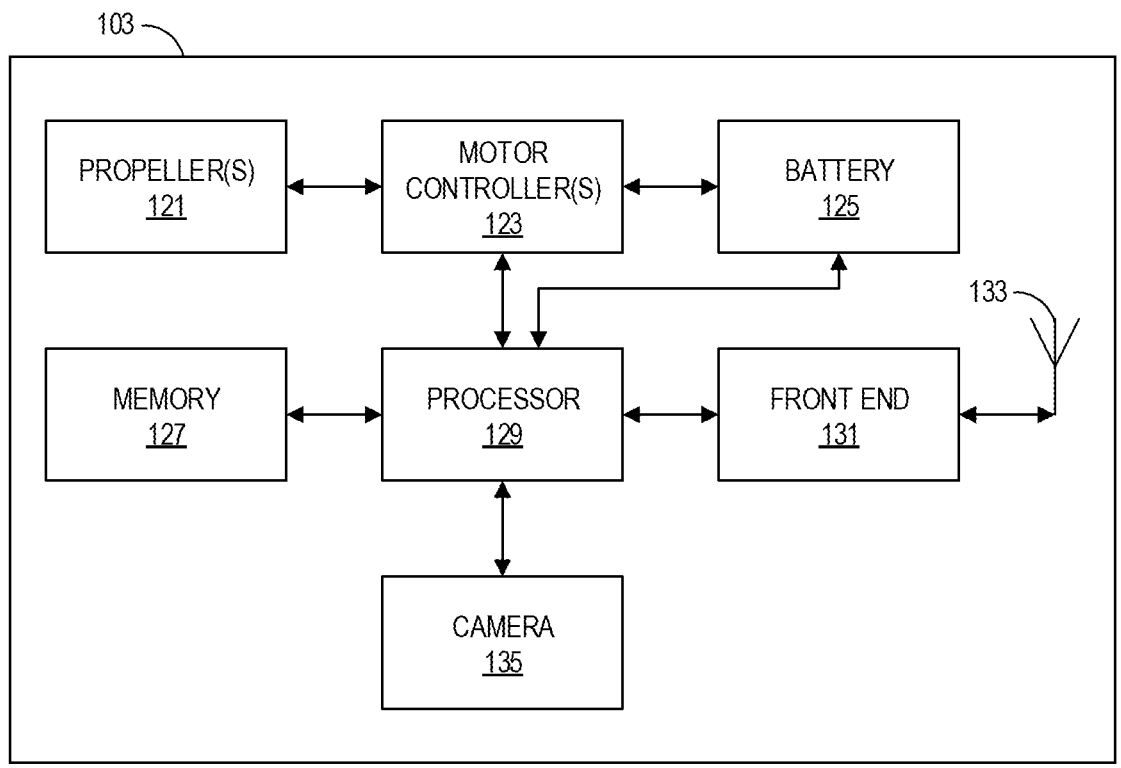
FIG. 2B illustrates an example drone from FIG. 1 which can be detected with the drone detection system of FIG. 2A in accordance with aspects of this disclosure.
Figure 2C:
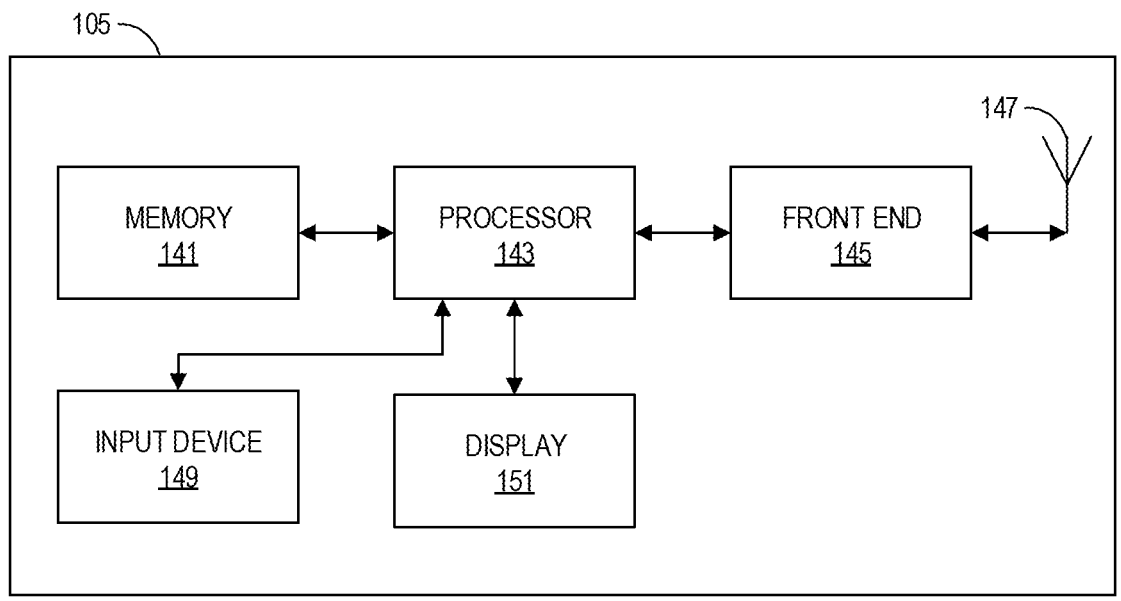
FIG. 2C illustrates an example controller from FIG. 1 which can be used to control the drone in accordance with aspects of this disclosure.

FIG. 2A illustrates an example drone detection system 101 which can be used to detect the presence of the one or more drones 103A-103N in accordance with aspects of this disclosure. In certain embodiments, the drone detection system 101 includes one or more nodes 161 as will be further explained with respect to FIGS. 4 and 5. In certain embodiments, each node 161 consists of circuitry for receiving RF signals and circuitry for transmitting RF signals. For example, each node 161 within the drone detections system 101 can include a processor 111, a memory 113, a front end 115, a plurality of transmit antennae 117A-117N, and a plurality of receive antennae 119A-119N.

In certain embodiments, the front end 115 can be configured as an Analog-to-Digital-Converter (ADC) for converting received signals. In certain embodiments, the front end 115 can be configured as a digital processing unit. In certain embodiments, the digital processing unit is in the form of, for example, field programmable gate array (FPGA) or software defined radio (SDR). In operation, the node 161 tunes to a specific frequency and samples at a rate that covers the signal of interest. Digitized samples are processed by the processor 111.

In certain embodiments, the drone detection system 101 includes a receiver 114, a transmitter 116, a sensor/detector 118, a jammer 120, a Digital-to-Analog Converter (DAC) 124, a mixer 126, and an amplifier 128.

In certain embodiments, a portion of the front end 115 is configured as a transmit front end 122. For example, in certain embodiments, the transmit front end 122 comprises the transmitter 116, the DAC 124, and the mixer 126. In certain embodiments, the transmit front end 122 comprises the amplifier 128.

Although illustrated in separate blocks in FIG. 2A, one or more of the blocks 111, 113-120, 122, 124, 126, and 128 may be implemented together by the same component(s). For example, in one implementation the receiver 114, the transmitter 116, the sensor/detector 118, and the jammer 120 can be implemented as part of the front end 115 illustrated in FIG. 2A.

Depending on the implementation, the drone detection system 101 can include a greater or fewer number of components than shown in FIG. 2A. For example, each node 161 within the drone detection system 101 need not comprise the same components and instead can comprise different combinations of components. For example, in certain embodiments where the drone detection system 101 is in a centralized configuration, one or more of the nodes 161 within the drone detection system 101 need not include the processor 111.

In certain embodiments, the processor 111 is shared by more than one node 161 within the drone detection system 101. In certain embodiments in the centralized configuration, each node within the drone detection system 101 includes the processor 111. However, each of the processors 111 within the nodes 161 of the drone detection system 101 need not have the same functionality. For example, in certain embodiments, the processor 111 of one of the nodes 161 has full functionality while the processors 111 within the remaining nodes have less than full functionality. In this way, certain tasks performed by the drone detection system 101 can be assigned to the node that includes the processor 111 having the required functionality without requiring all the nodes 161 to have that same functionality and associated cost.

In other embodiments, one or more of the antennae 117A-119N can be used for both transmitting and receiving signals.

In certain embodiments, the one or more nodes 161 of the drone detection system 101 are configured to receive an RF signal (e.g., the RF signals 107A-107N of FIG. 1) via one of the receive antennae 119A-119N. The one of the receive antennae 119A-119N provides the received RF signal to the front end 115. In certain embodiments, the front end 115 can process the received RF signal into a format that can be read by the processor 111. For example, in certain embodiments, the front end 115 may perform one or more of the following actions: filtering, amplifying, analog-to-digital conversion, etc. on the received RF signal.

In certain embodiments, the memory 113 can store computer readable instructions for causing the processor 111 to detect the presence of a drone (e.g., the drones 103A-103N of FIG. 1) based on the RF signals received via the receive antennae 119A-119N. In addition, in certain embodiments, the drone detection system 101 can also be configured to provide a signal (e.g., a jamming signal or an RF communication signal) to the front end 115 to be transmitted to the detected drone(s). The front end 115 can then process the signal received from the processor 111 before providing the processed signal to one or more of the transmit antennae 117A-117N.

There are several different techniques that the drone detection system 101 can use to detect the presence of the drones 103A-103N. For example, the drone detection system 101 can scan the airwaves at frequencies known to be used by particular model(s) of the drones 103A-103N. If a known protocol is identified, the drone detection system 101 can then decode the signal as if it was the intended receiver/controller 105A-105N. Depending on the embodiment, these decoding steps can include: synchronization, channel estimation, deinterleaving, descrambling, demodulation, and error control decoding.

In certain embodiments, the drone detection system 101 can be configured to perform some of the aforementioned steps blindly due to lack of knowledge (such as device id) on information known by the controller 105A-105N. Aspects of the disclosure uniquely identify a drone 103A-103N from flight and drone data. Other aspects of this disclosure relate to how the drone detection system 101 can determine additional or key information for the detected drone 103A-103N. Once detected, the drone detection system 101 can provide alert(s) regarding the presence of the one or more drones 103A-103N.

The drone detection system 101 can monitor the presence of the one or more drones 103A-103N. As part of monitoring, a position of the one or more drones 103A-103N relative to the environment 100 can be monitored in real-time to determine if the position of the one or more drones 103A-103N strays inside or outside acceptable airspace.

There are also several mitigation actions which can be taken by the drone detection system 101. For example, after detecting the one or more drones 103A-103N, the drone detection system 101 may take one or more of the actions described with reference to FIG. 10. For example, in certain embodiments, these actions can include do nothing/keep monitoring, drone-specific jamming, wideband jamming, and control takeover.

FIG. 2B illustrates an example drone 103 which can be detected with the drone detection system 101 in accordance with aspects of this disclosure. In certain embodiments, the drone 103 includes one or more propellers 121, one or more motor controllers 123, a battery or other power source 125, a memory 127, a processor 129, a front end 131, an antenna 133, and a camera 135. As described above, the antenna 133 may be configured to receive RF signals 107 from the controller 105 (see FIG. 2C) and provide RF signals 107 back to the controller 105 (e.g., images obtained from the camera 135). In certain embodiments, the RF signals 107 sent/received from the antenna 133 are provided to/from the processor 129 and processed by the front end 131. In certain embodiments, the propeller(s) 121 provide lift and control movement of the drone 103 as it maneuvers through airspace. The propeller(s) 121 may also include one or more motor(s) (not illustrate) configured to individually power each of the propeller(s) 121.

In certain embodiments, the motor controller(s) 123 are configured to receive instructions from the processor 129 (e.g., based on instructions stored in the memory 127 and the RF signal 107 received from the controller 105) to move the drone 103 to a specific point in the airspace and translate the received instructions into motor position commands which are provided to the propeller(s) 121. In certain embodiments, the battery 125 provides power to each of the components of the drone 103 and has sufficient power storage to enable the propellers 121 to maneuver the drone 103 for a predetermined length of time. The camera 135 can capture images in real-time and provide the captured images to the controller 105 via the antenna 133 which can aid a user in controlling movement of the drone 103.

FIG. 2C illustrates an example controller 105 which can be used to control the drone 103 in accordance with aspects of this disclosure. In certain embodiments, the controller 105 comprises a memory 141, a processor 143, a front end 145, an antenna 147, an input device 149, and a display 151. As described above, the antenna 147 may be configured to receive RF signals 107 (e.g., images obtained from the camera 135) from the drone 103 (see FIG. 2B) and provide RF signals 107 back to the drone 103 to control movement of the drone 103. In certain embodiments, the RF signals 107 sent/received from the antenna 147 are provided to/from the processor 143 and processed by the front end 145. In certain embodiments, the input device 149 is configured to receive input from a user which can be used by the processor 143 to generate commands for controlling movement of the drone 103. In certain embodiments, the display 151 is configured to display images received from the drone 103 to the user to provide feedback on the current position of the drone 103 and its environment 100. In some embodiments, the display can be implemented as a pair of goggles worn by the user to provide a first person view of images obtained by the camera 135.

Figure 3:
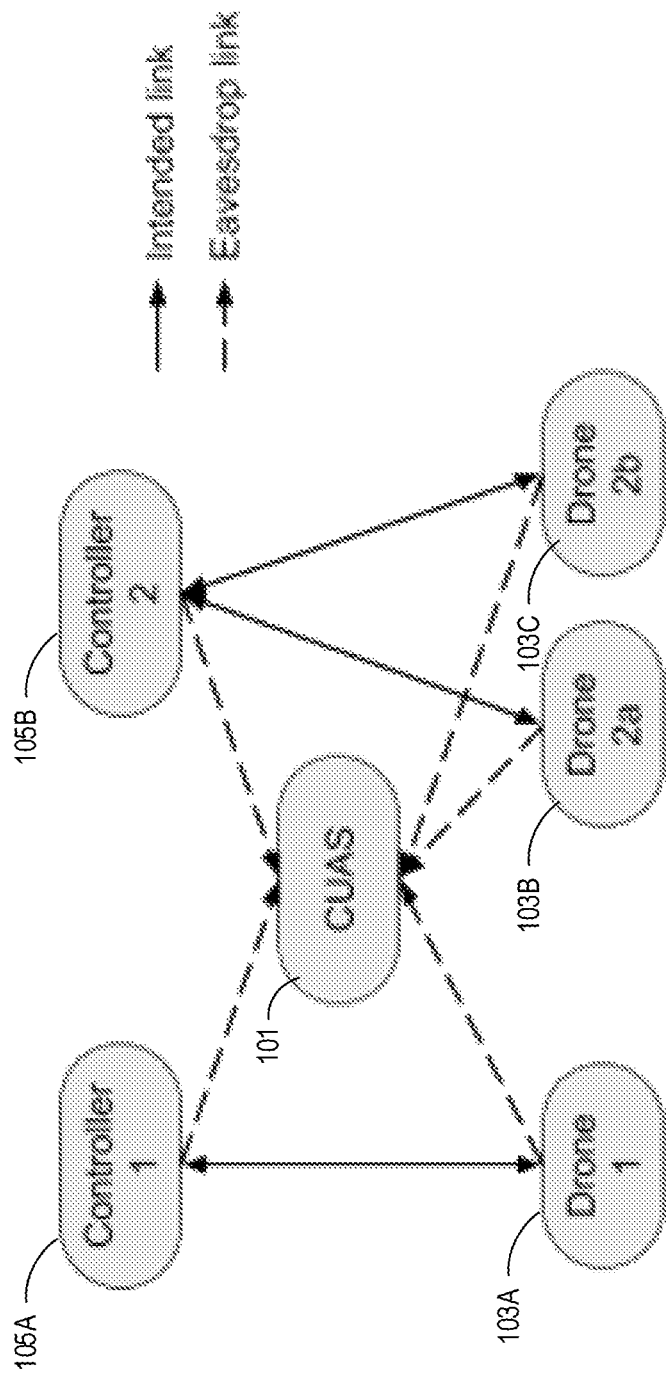
FIG. 3 illustrates another example drone detection system which can be used to detect the presence of one or more drones in accordance with aspects of this disclosure.

FIG. 3 illustrates another example drone detection system 101 which can be used to detect the presence of the one or more drones 103A-C in accordance with aspects of this disclosure. In particular, the drone detection system 101 illustrated in FIG. 3 is a simplified system model that includes two controllers 105A-B controlling three drones 103A-C. Of course, the disclosure is not limited to the illustrated system model and can include any number of drones 103 and controllers 105. Further the number of drones 103 associated with a given controller 105 is not limited to the illustrated system model.

Figure 4:
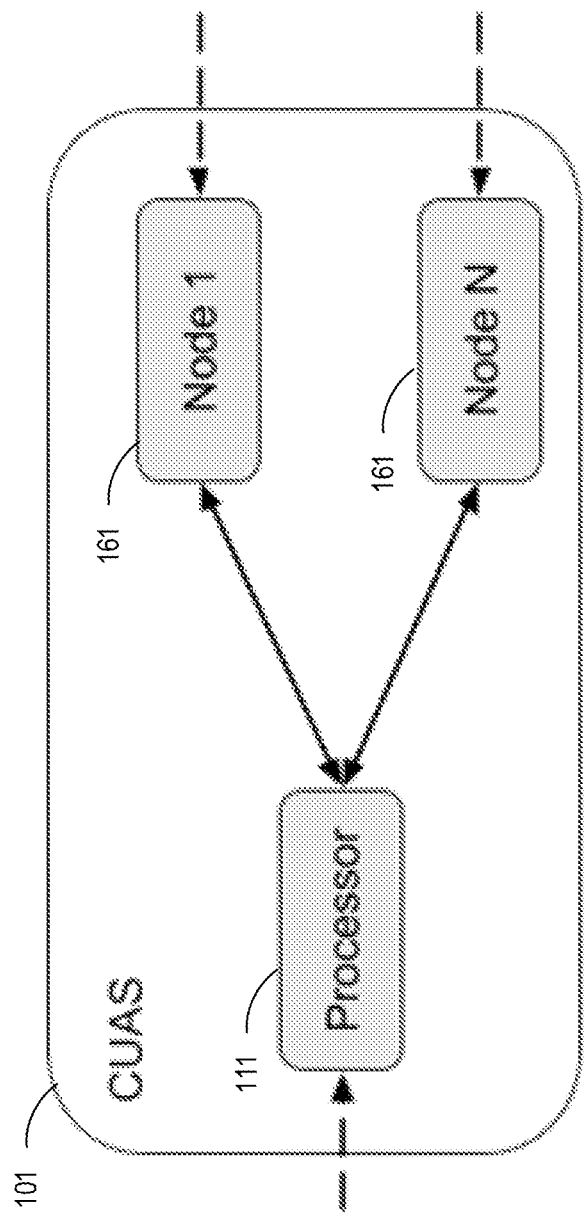
FIG. 4 illustrates an embodiment of the drone detection system from FIG. 3 in a centralized configuration.
Figure 5:
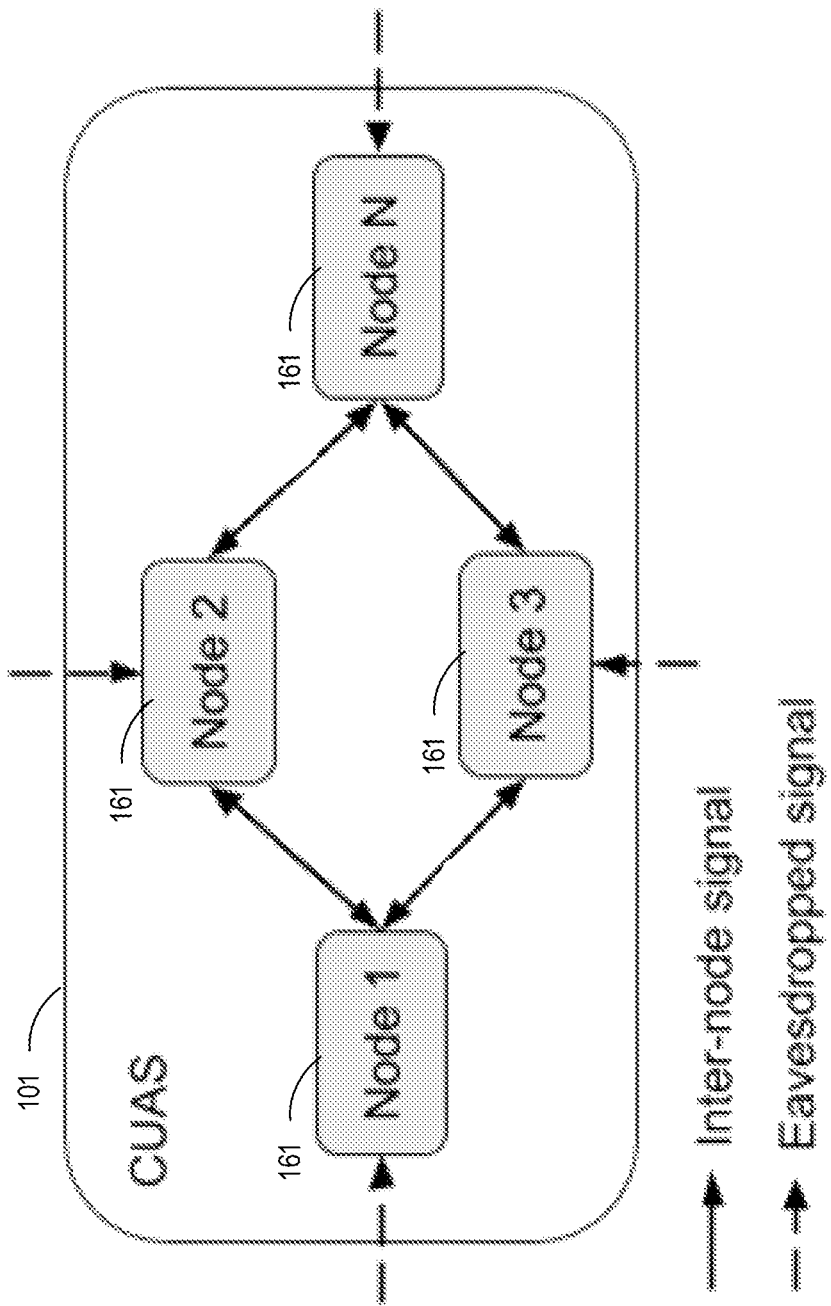
FIG. 5 illustrates an embodiment of the drone detection system from FIG. 3 in a decentralized configuration.

In certain embodiments, the drone detection system 101 comprises multiple nodes 161 over a region. The individual nodes 161 can cooperate with other nodes 161 in their detection and mitigation. In a centralized configuration as is illustrated in FIG. 4, the nodes 161 send intermediate detection results to a centralized processor 111. The centralized processor 111 can then determine detection results. In a decentralized configuration as is illustrated in FIG. 5, the nodes 161 share their detection results and can mitigate the drones 103 either by themselves or cooperatively with the other nodes 161.

In certain embodiments, the drone detection system 101 can receive signals from all the drones 103 and/or controllers 105 within a detection range of the drone detection system 101. In certain embodiments, the drone detection system 101 compares stored data or knowledge of the communication protocols used by different combinations of drones 103 and controllers 105 to communicate with each other with the received signals. The drone detection system 101 can gather the predetermined data or knowledge prior to deployment. When analyzing the eavesdrop link, the drone detection system 101 can rely on the predetermined data related to the communication protocol used between the drone 103 and its controller 105. Different brands of drones and different drone models within a brand may use different communication protocols. Different versions of the same drone model can use different communication protocols which presents additional complexity to the analysis. Reverse engineering can be employed to determine the data and knowledge relating to expected communication protocols. For example, the predetermined data can include frequencies known to be used by a particular drone model.

In certain embodiments, the drone detection system 101 receives update data to the predetermined data or knowledge after deployment of the drone detection system 101. In certain embodiments, the drone detection system 101 itself updates the predetermined data or knowledge based on its ongoing operations of detecting, monitoring, and/or mitigating drones 101.

The drone detection system 101 can leverage the predetermined data to determine additional data uniquely associated with the detected drone 103 and its controller 105. For example, the drone detection system 101 can scan the airwaves at frequencies known to be used by a particular drone model. If a known protocol is identified, then the drone detection system 101 can proceed to decode the signal as if it was the intended controller 105.

The drone detection system 101 can identify flight and drone data once the communication protocol used by the drone 103 has been decoded. Exemplary flight and drone data can include a unique identifier of the drone 103 such as one or more of a serial number, a frequency hopping pattern, and/or a transmission timing and frequency.

FIG. 4 illustrates an embodiment of the drone detection system 101 from FIG. 3 in a centralized configuration. A centralized configuration involves individual nodes 161 sending intermediate detection results to a processor 111 that is shared or centralized.

Depending on the implementation, the drone detection system 101 can include a greater or fewer number of components than shown in FIG. 2A. For example, each node 161 within the drone detection system 101 need not comprise the same components and instead can comprise different combinations of components. For example, in the embodiment illustrated in FIG. 4 where the drone detection system 101 is in a centralized configuration, one or more of the nodes 161 within the drone detection system 101 need not include the processor 111. In certain embodiments, the processor 111 is shared by more than one node 161 within the drone detection system 101. In certain embodiments in the centralized configuration, each node within the drone detection system 101 includes the processor 111. However, each of the processors 111 within the nodes 161 of the drone detection system 101 need not have the same functionality. For example, in certain embodiments, the processor 111 of one of the nodes 161 has full functionality while the processors 111 within the remaining nodes have less than full functionality. In this way, certain tasks performed by the drone detection system 101 can be assigned to the node that includes the processor 111 having the required functionality without requiring all the nodes 161 to have that same functionality and associated cost. The shared processor 111 may also perform receiving tasks as other nodes 161. The link between nodes 161 and the centralized processor 111 can either be wired or wireless.

FIG. 5 illustrates an embodiment of the drone detection system 101 from FIG. 3 in a decentralized configuration. In a decentralized configuration, the nodes 161 share their detection results and can mitigate the drones 103 either by themselves or cooperatively with other nodes 161.

In certain embodiments, the drone detection system 101 is mounted on a fixed location. In other embodiments, the drone detection system 101 is mounted onto a mobile unit. Fixed location setup may be advantageous for surveillance and monitoring at a fixed location such as border wall, airports, or other secured sites. Mobile mounting may be advantageous for surveillance over a larger area. In such an embodiment, the drone detection system 101 can be attached to a vehicle, vessel, or aircraft. In this way, multiple nodes 161 can be deployed over a region with individual nodes 161 cooperating in their detection and mitigation strategies.

Detection of Drone(s) Using Predetermined Data

In recent years, the use of drones 103 has gained popularity due to their affordability and versatility. Drones 103 have been widely used in many applications from recreational flying such as drone racing to commercial uses such as package delivery and real estate photography. According to FAA Forecast, the use of non-model (commercial) drones 103 will grow three-fold from 2018 to 2023 whereas the use of model (recreational) drones 103 will increase from 1.25 to 1.39 million units in 5 years. However, unauthorized drone activities and incidents have been reported more and more frequently near airports, stadiums, and borders, which has caused growing concerns about public safety and homeland security. Therefore, an effective drone detection system 101 becomes an indispensable mechanism for law enforcement and military to detect, identify, and disable any potential and imminent threats caused by the improper and unauthorized uses of drones 103.

In certain embodiments, the drone detection system 101 is capable of detecting any wireless signal transmitted from the drones 103 and the controllers 105 when they are in the detection range and determining when in time and where in frequency the received signals are detected. Nevertheless, the time and frequency information are subject to errors, which can be caused by sensing and measurement errors, channel impairments such as fading and interference, and/or hardware limitations such as carrier frequency offsets and timing jitters. One of the main challenges in detecting the drones 103 is to decode noisy time-frequency samples. Decoding is further complicated by multi-target scenarios where multiple drones 103 are present within the detection range. Techniques for detecting a radio-frequency (RF) signal transmitted between a drone and a drone controller are disclosed in U.S. patent application Ser. No. 16/871,713, filed May 11, 2020, and Ser. No. 16/886,482, filed May 28, 2020, both of which are hereby incorporated by reference in their entireties.

Figure 6:
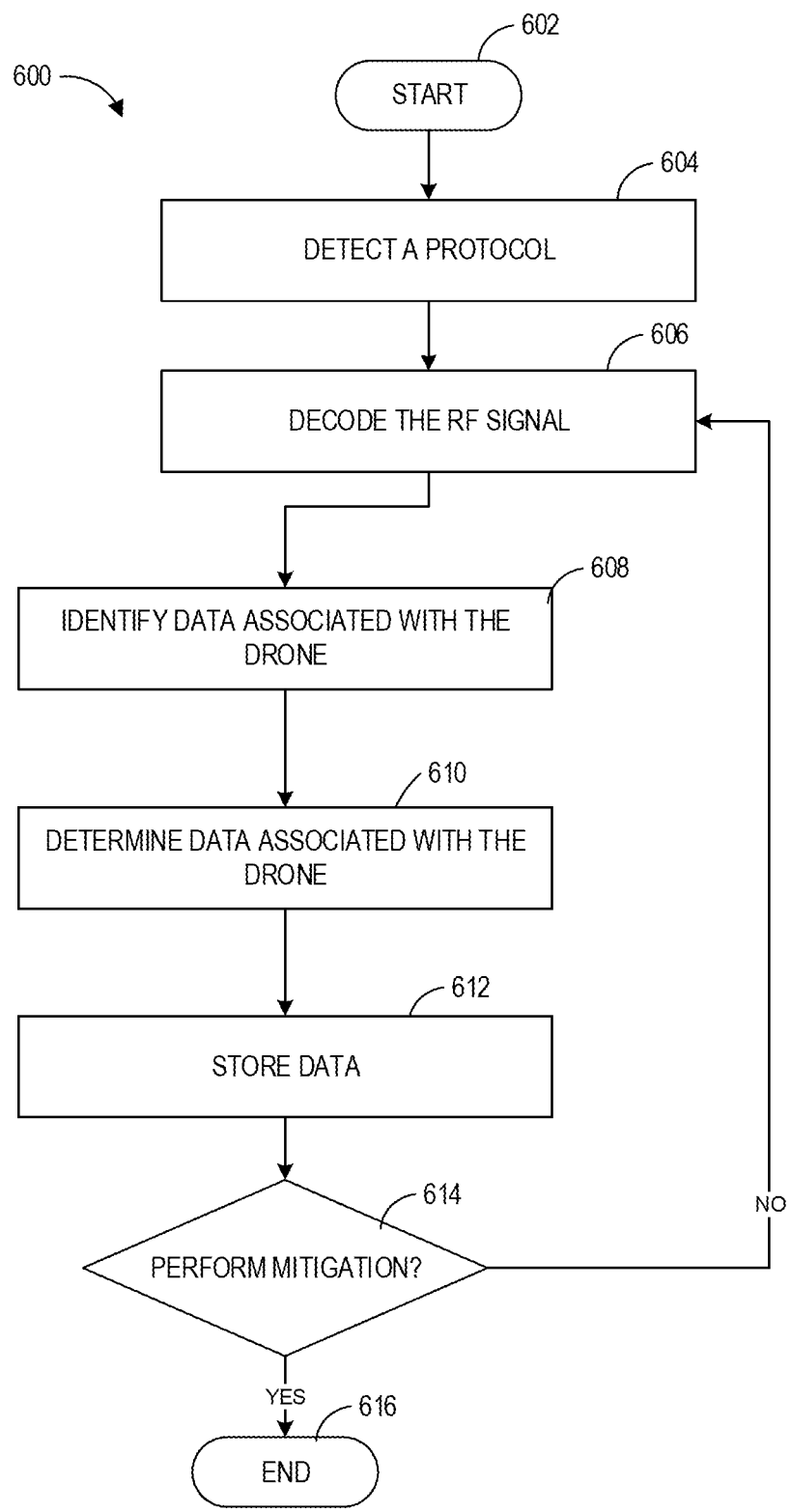
FIG. 6 illustrates a method for detecting, monitoring, and mitigating unauthorized drones.

Overview of Techniques for Detecting, Monitoring, and Mitigating Unauthorized Drones FIG. 6 illustrates a method 600 for detecting, monitoring, and mitigating unauthorized drones 103A-103N in accordance with aspects of this disclosure. Specifically, the method 600 involve detecting a communication protocol used for the one or more drones 103 within a detection range. In particular, the drone detection system 101 can detect the protocol used for communication between the one or more drones 103A-103N and the controllers 105A-105N in order to detect the presence of the one or more drones 103A-103N.

The method 600 begins at block 602. At block 604, the method 600 involves detecting the communication protocol. The protocol can be in the form of a set of samples received by the node 161 for a time interval. The drone detection system 101 can compare stored data or knowledge of the communication protocols used by different combinations of drones 103 and controllers 105 to communicate with each other with the received signals. When analyzing the eavesdrop link, the drone detection system 101 can rely on the predetermined data related to the communication protocol used between the drone 103 and its controller 105. The drone detection system 101 can gather the predetermined data or knowledge prior to deployment. In certain embodiments, the drone detection system 101 receives update data to the predetermined data or knowledge after deployment of the drone detection system 101. In certain embodiments, the drone detection system 101 itself updates the predetermined data or knowledge based on its ongoing operations of detecting, monitoring, and/or mitigating drones 101.

At block 606, the method 600 involves decoding the RF signal. Exemplary decoding steps are further disclosed with respect to FIG. 7. Once decoded, the drone detecting system 101 can identify flight and drone data. Exemplary methods for determining flight and drone data is disclosed with respect to FIGS. 8 and 9. For example, the method 600 continues to block 608 where data is identified as being associated with the drone 103. Exemplary flight and drone data can include a unique identifier of the drone 103 such as one or more of a serial number, a frequency hopping pattern, and/or a transmission timing and frequency. In certain embodiments, exemplary flight and drone data can include wireless signal properties such as received energy level, delay spread and doppler spread, power delay profile, carrier frequency offset, and/or sampling time offset.

The method 600 continues to block 610 where the drone detecting system 101 can determine data associated with the drone 103 or key data beyond the unique identifiers identified in block 608. Aside from the unique identifiers identified in block 608, the drone detection system 101 can determine in block 610, for example, home position, flight duration, traveling velocity, GPS coordinates, and video feed.

The method 600 moves to block 612 where the node 161 stores the aggregate of the data gathered in blocks 608 and 610. The drone detection system 101 can determine abstract information related to the drone 103 by analyzing the aggregated stored data. For example, the abstract information can include weight of the drone 103, whether the drone 103 is under active human control or traveling a pre-programmed route, and intention estimation based on route analysis.

The method 600 continues to decision block 614 to determine whether to perform mitigation on the drone 103. When determining whether to perform mitigation, the drone detection system 101 can monitor and uniquely identify the detected drone 103 in accordance with FIG. 8. Mitigation can be performed as disclosed with respect to FIG. 10. If mitigation is not performed for a specific drone 103, the method 600 returns to block 606 where the drone detections system 101 continues to decode RF signals transmitted to or from the specific drone 103. The method 600 can also return to block 604 to detect new target drones 103.

Decoding the RF Signal of the Drone

Figure 7:
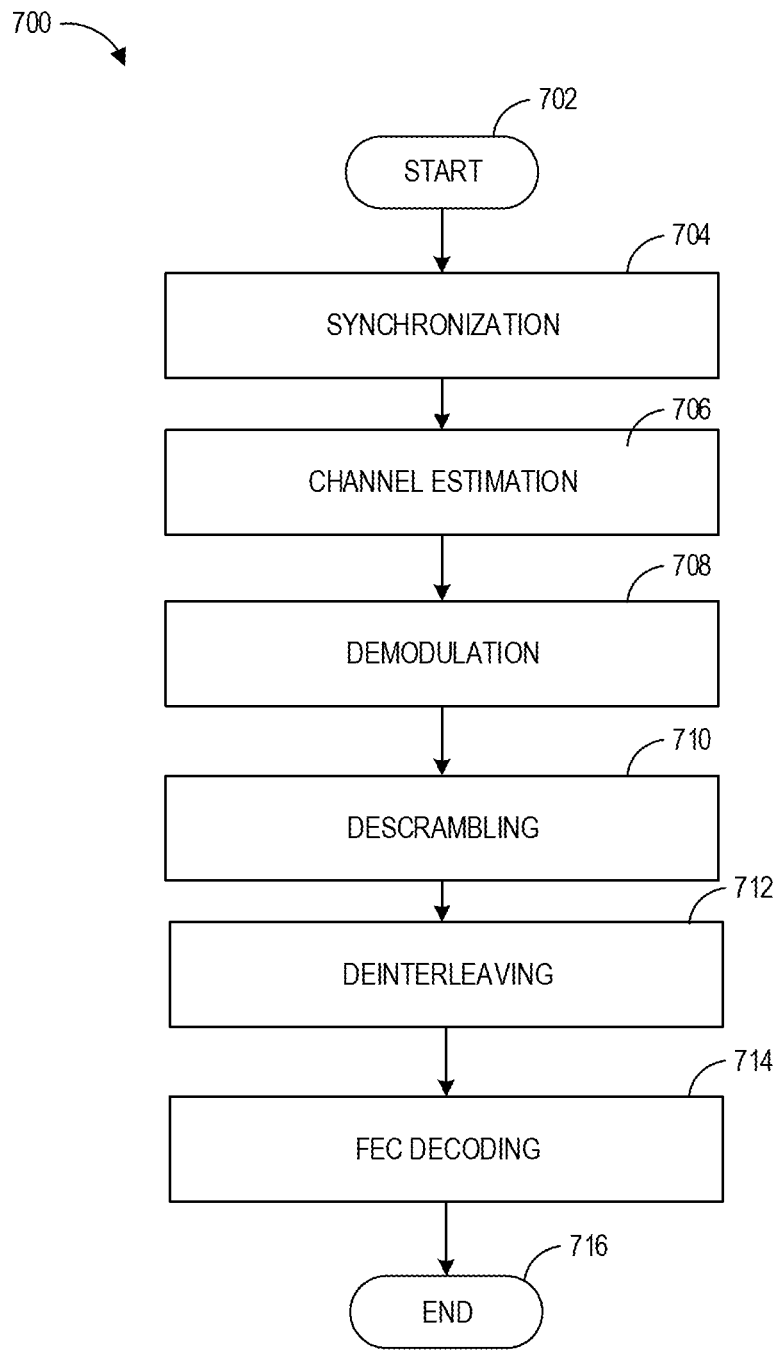
FIG. 7 illustrates a method for decoding the RF signal of the drone in accordance with aspects of this disclosure.

FIG. 7 illustrates a method 700 for decoding the RF signal of a drone 103 in accordance with aspects of this disclosure. For example, the method 700 can be performed as a part of block 606 of method 600. The method 600 involves decoding the RF signal 107 transmitted between the drone 103 and the controller 105.

The method 700 begins at block 704 where synchronization is performed on the received RF signal. The method 700 continues to block 706 where channel estimation is performed on the received RF signal. Signal parameters of the RF signal 107 can be estimated in accordance with aspects of this disclosure. The decoding of the RF signal 107 may be performed by configuring the receiver 114 to follow the reconstructed signal parameters and synchronize with the RF signal 107.

The method 700 then moves to block 708 where demodulation is performed. The method 700 then moves to block 710 where descrambling is performed. The method 700 continues with block 714 where forward error correction (FEC) decoding is performed. The method 700 ends at block 716.

Monitoring the Drone(s)

Once a drone 103 has been detected, for example, at block 604 of FIG. 6, the drone detection system 101 can monitor the drone 103 for a period of time before potentially taking mitigation actions against the drone 103.

Figure 8:
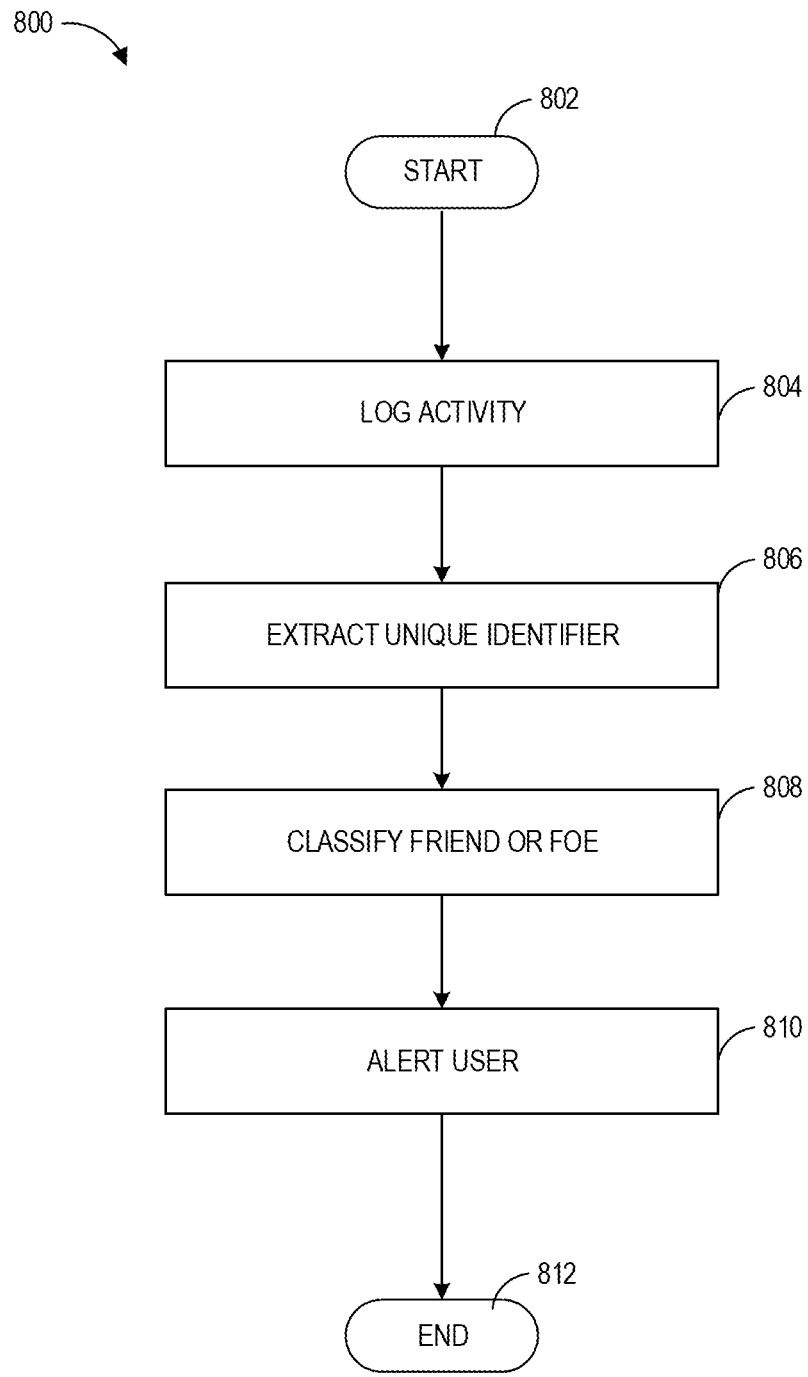
FIG. 8 illustrates a method for monitoring and identifying the detected drone in accordance with aspects of this disclosure.

FIG. 8 illustrates a method 800 for monitoring and uniquely identifying the detected drone 103 in accordance with aspects of this disclosure. The method 800 begins at block 802 and moves to block 804 where the drone detection system 101 logs activity of target drones 103. The method 800 moves to block 806 where the drone detection system 101 extracts one or more unique identifiers from the decoded RF signal and/or the wireless properties of the RF signal.

The drone detection system 101 can include predetermined data or knowledge of expected communication protocols used between drones 103 and their controllers 105. The drone detection system 101 can store the predetermined data or knowledge of the communication protocols used by different combinations of drones 103 and controllers 105 to communicate with each other. The drone detection system 101 can gather the predetermined data or knowledge prior to deployment. In certain embodiments, the drone detection system 101 receives update data to the predetermined data or knowledge after deployment of the drone detection system 101. In certain embodiments, the drone detection system 101 itself updates the predetermined data or knowledge based on its ongoing operations of detecting, monitoring, and/or mitigating drones.

In this way, the drone detection system 101 can leverage the predetermined data to determine additional data uniquely associated with the detected drone and its controller. For example, the drone detection system 101 can identify or extract flight and drone data once the communication protocol used by the drone has been decoded. Exemplary flight and drone data can include a unique identifier of the drone such as one or more of a serial number, a frequency hopping pattern, and/or a transmission timing and frequency. In certain embodiments, exemplary flight and drone data can include wireless signal properties such as received energy level, delay spread and doppler spread, power delay profile, carrier frequency offset, and/or sampling time offset.

The method 800 moves to block 808 where the drone detection system 101 can classify the target drone 103 as, for example, friend or foe based at least partly on the extracted unique identifier in block 806. The method 800 continues to block 810 where the user is alerted to the determination in block 808. The method 800 ends at block 812.

Determining Additional Key Information

Certain aspects of this disclosure may relate to how the drone detection system 101 can determine additional or key information for the detected drone 103. Exemplary key information includes, home position, flight duration, traveling velocity, GPS coordinates, and/or video feed.

Figure 9:
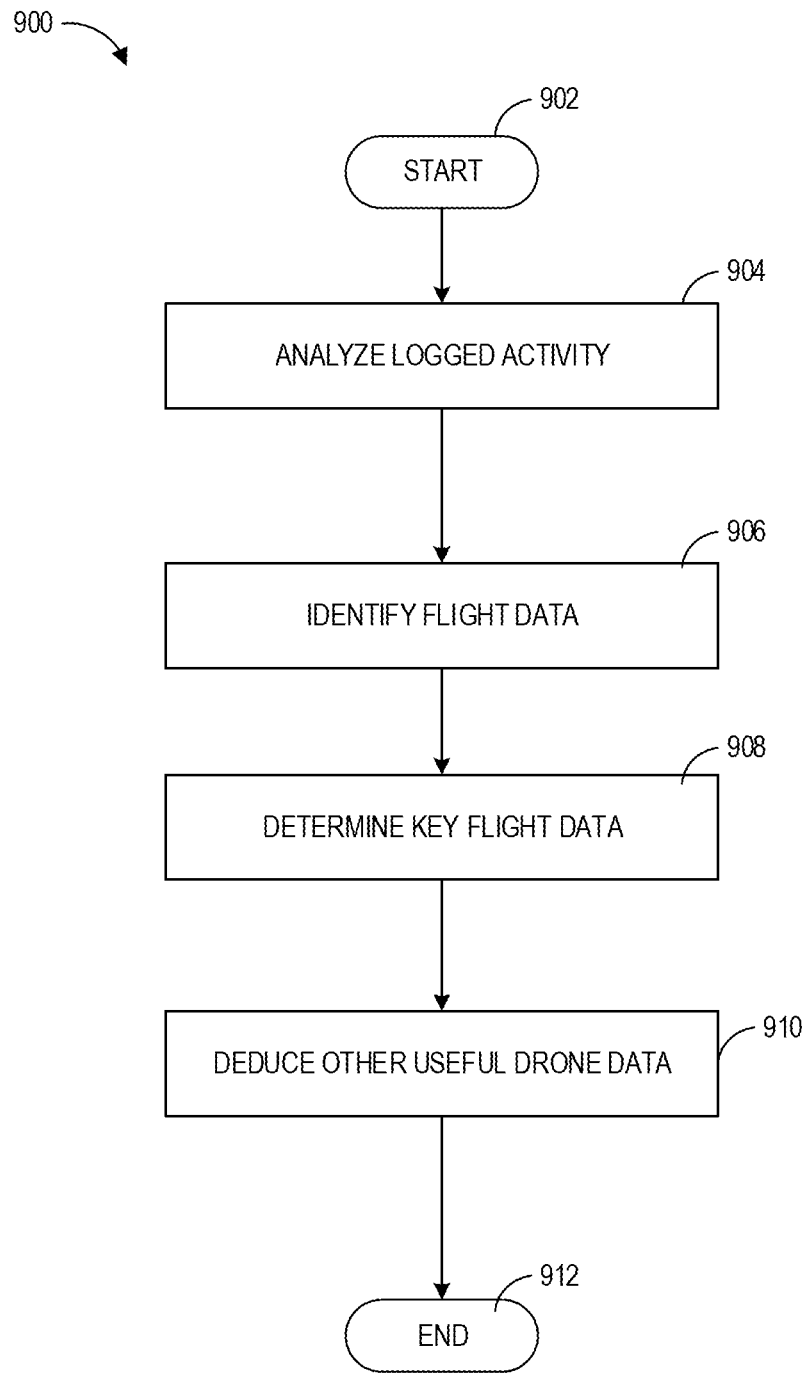
FIG. 9 illustrates a method for determining flight and drone data in accordance with aspects of this disclosure.

FIG. 9 illustrates a method 900 for determining additional or key information in accordance with aspects of this disclosure. The method 900 begins at block 902 and then moves to block 904 where logged data related to the target drone 103 is analyzed by the drone detection system 101. The logged data can include stored data associated with the drone 103 and determined from the decoded RF signal 107. For example, the data can include any activities performed by the drone 103 (e.g., flight data) and drone behaviors that may indicate whether the drone 103 is a friend or foe.

The method 900 moves to block 906 where flight data for the drone 103 is identified. The method moves to block 908 where the drone detection system 101 determines key flight data from the flight data identified in block 906 for the drone 103. Exemplary flight data includes home position, flight duration, traveling velocity, GPS coordinates, and/or video feed.

The method 900 continues at block 910 where other useful information is deduced from the key flight data determined in block 908. Exemplary useful information includes weight of the drone 103, whether the drone 103 is under active human control or traveling a pre-programmed route, and intention estimation based on route analysis. The method ends at block 912.

Mitigating the Drone(s)

After determining that mitigation of the drone 103 is appropriate and in certain embodiments, the drone detection system 101 performs one or more of a number of different mitigation actions in accordance with aspects of this disclosure.

Figure 10:
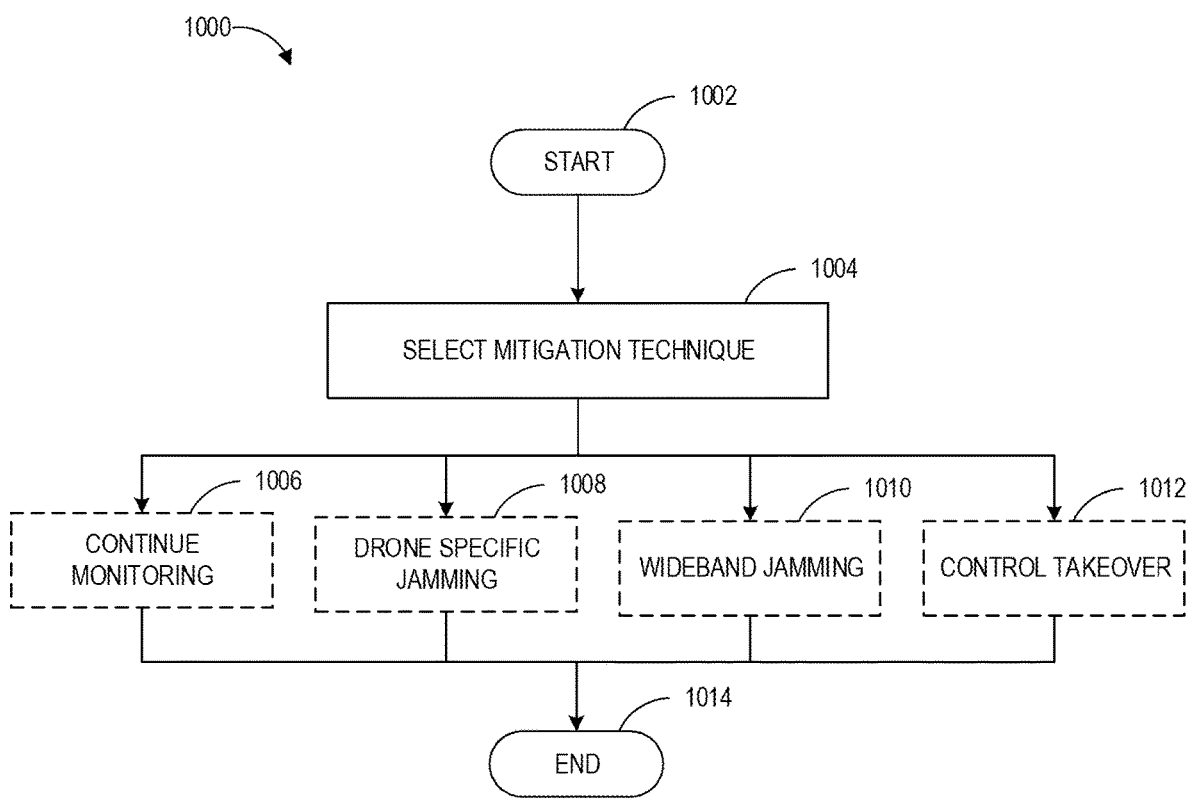
FIG. 10 illustrates a method performed by the drone detection system to mitigate the drone.

FIG. 10 is an example method 1000 which can be performed by the drone detection system 101 to mitigate one or more of the drones 103. The method 1000 begins at block 1002. In certain implementations, the method 1000 may be performed in response to determining that mitigation actions are warranted in block 614 of FIG. 6. At block 1004, the method 1000 involves selecting a mitigation technique to perform. The method 1000 then involves continuing to one of blocks 1006-1012 based on the mitigation technique selected in block 1004.

At block 1006, the method 1000 involves continuing to monitor the drone 103, which may involve returning to block 606 of method 600. For example, if the drone 103 is determined to be friendly and/or if the drone detection system 101 does not have the legal authority to take more aggressive actions, the drone detection system 101 may only be authorized to continue monitoring the drone 103 while alerting a user to the presence of the drone 103.

At block 1008, the method 1000 involves performing drone specific jamming. For example, in the case that the drone detection system 101 has estimated the frequency hopping parameters used by the drone 103, the drone detection system 101 can configured the jammer 120. The jammer 120 can then generate a jamming signal and transmit the jamming signal to all drones 103 within the detection range via the transmit antenna 117 to disrupt the RF communications between the drones 103 and the controllers 105.

At block 1010, the method 1000 involves the drone detection system 101 performing wideband jamming. In certain embodiments, wideband jamming may be appropriate where the drone detection system 101 does not have sufficient knowledge of the communication protocol used by the RF signal 107 to perform drone specific jamming and where the wideband jamming will not affect other friendly drones 103 within the environment 100.

At block 1012, the method involves the drone detection system 101 taking over control of the drone 103. For example, and in certain embodiments, using the estimated frequency hopping parameters estimated in accordance with aspects of this disclosure to reconstruct the RF signal 107, the drone detection system 101 can send commands to the drone 103 in order to have the drone 103 perform certain maneuvers, such as landing the drone 103 in a safe area. The method 1000 ends at block 1014.

Implementing Systems and Terminology

Implementations disclosed herein provide systems, methods and apparatus for detecting the presence of drones. It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The drone detection functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the implementations shown herein but is to be accorded the widest scope consistent with the principles and novel features disclosed herein.

What is claimed is:

1. A system for detecting presence of a drone, the system comprising:
   a radio-frequency (RF) receiver configured to receive an RF signal;
   a processor; and
   a computer-readable memory in communication with the processor and having stored thereon computer-executable instructions to cause the processor to:
   receive a set of samples of the RF signal from the RF receiver;
   obtain predetermined data of expected communication protocols used between the drone and a controller;
   identify one of the expected communication protocols as corresponding to the RF signal;
   decode the RF signal based on the identified one of the expected communication protocols; and
   extract a unique identifier of the drone based at least partially on the decoded RF signal,
   wherein the system is configured as a plurality of nodes, each node comprising at least the RF receiver and the computer-readable memory,
   wherein the plurality of nodes is arranged in a decentralized configuration, and
   wherein the plurality of nodes share their detection results and mitigate the drone either by themselves or cooperatively with other nodes within the plurality of nodes.

2. The system of claim 1, wherein the RF signal is decoded using error control decoding or forward error correction (FEC) decoding.

3. The system of claim 1, wherein the decoding of the RF signal comprises synchronizing the RF signal.

4. The system of claim 1, wherein the unique identifier relates to one or more of a received energy level of the RF signal, a delay spread and a doppler spread of the RF signal, a power delay profile of the RF signal, a carrier frequency offset of the RF signal, or a sampling time offset of the RF signal.

5. The system of claim 1, wherein each of the nodes comprises a plurality of receive antennae configured to receive the RF signal.

6. The system of claim 1, wherein the processor further:
   classifies the drone as friend or foe; and
   alerts a user of the classification.

7. The system of claim 1, wherein the unique identifier is one or more of a frequency hopping pattern of the RF signal, a serial number of the drone, or a transmission timing and frequency of the RF signal.

8. The system of claim 1, further comprising logging activity of the drone, wherein the processor further extracts key flight data from the logged activity, and wherein the key flight data includes one or more of a home position, a flight duration, a travelling velocity, Global Positioning System (GPS) coordinates, or a video feed.

9. The system of claim 1, further comprising logging activity of the drone, wherein the processor further determines from the logged activity one or more of a weight of the drone, whether the drone is under active human control, whether the drone is travelling a pre-programmed route, or intention estimation of the drone based on route analysis.

10. A method for detecting presence of a drone, the method comprising:
  receiving a set of samples of a radio-frequency (RF) signal from an RF receiver;
  obtaining predetermined data of expected communication protocols used between the drone and a controller;
  identifying one of the expected communication protocols as corresponding to the RF signal;
  decoding the RF signal based on the identified one of the expected communication protocols; and
  extracting a unique identifier of the drone based at least partially on the decoded RF signal,
  wherein the method is performed by a plurality of nodes, each node comprising at least the RF receiver,
  wherein the plurality of nodes is arranged in a decentralized configuration, and
  wherein the plurality of nodes share their detection results and mitigate the drone either by themselves or cooperatively with other nodes within the plurality of nodes.

11. The method of claim 10, wherein the RF signal is decoded using error control decoding or forward error correction (FEC) decoding.

12. The method of claim 10, wherein the decoding of the RF signal comprises synchronizing the RF signal.

13. The method of claim 10, wherein the unique identifier relates to one or more of a received energy level of the RF signal, a delay spread and a doppler spread of the RF signal, a power delay profile of the RF signal, a carrier frequency offset of the RF signal, or a sampling time offset of the RF signal.

14. The method of claim 10, wherein each of the nodes comprises a plurality of receive antennae configured to receive the RF signal.

15. The method of claim 10, further comprising:
  classifying the drone as friend or foe; and
  alerting a user of the classification.

16. The method of claim 10, wherein the unique identifier is one or more of a frequency hopping pattern of the RF signal or a transmission timing and frequency of the RF signal.

17. A non-transitory computer readable storage medium having stored thereon instructions that, when executed, cause a computing device to:
  receive a set of samples of a radio-frequency (RF) signal from an RF receiver;
  obtain predetermined data of expected communication protocols used between a drone and a controller;
  identify one of the expected communication protocols as corresponding to the RF signal;
  decode the RF signal based on the identified one of the expected communication protocols; and
  extract a unique identifier of the drone based at least partially on the decoded RF signal,
  wherein the computing device is configured as a plurality of nodes, each node comprising at least the RF receiver,
  wherein the plurality of nodes is arranged in a decentralized configuration, and wherein the plurality of nodes share their detection results and mitigate the drone either by themselves or cooperatively with other nodes within the plurality of nodes.

18. The non-transitory computer readable storage medium of claim 17, wherein the RF signal is decoded using error control decoding or forward error correction (FEC) decoding.

19. The non-transitory computer readable storage medium of claim 17, wherein the decoding of the RF signal comprises synchronizing the RF signal.

20. The non-transitory computer readable storage medium of claim 17, wherein the unique identifier relates to one or more of a received energy level of the RF signal, a delay spread and a doppler spread of the RF signal, a power delay profile of the RF signal, a carrier frequency offset of the RF signal, or a sampling time offset of the RF signal.

* * * * *